United States Patent
Bialer et al.

(10) Patent No.: US 11,327,170 B2
(45) Date of Patent: May 10, 2022

(54) AZIMUTH AND ELEVATION RADAR IMAGING WITH SINGLE-DIMENSION ANTENNA ARRAYS OF RADAR SYSTEM

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 504 days.

(21) Appl. No.: 16/390,920

(22) Filed: Apr. 22, 2019

(65) Prior Publication Data
US 2020/0333457 A1     Oct. 22, 2020

(51) Int. Cl.
| | |
|---|---|
| *G01S 13/89* | (2006.01) |
| *G01S 13/931* | (2020.01) |
| *G01S 7/41* | (2006.01) |
| *G01S 13/58* | (2006.01) |
| *G01S 7/35* | (2006.01) |

(52) U.S. Cl.
CPC .............. *G01S 13/89* (2013.01); *G01S 7/352* (2013.01); *G01S 7/417* (2013.01); *G01S 13/588* (2013.01); *G01S 13/931* (2013.01); *G01S 7/356* (2021.05)

(58) Field of Classification Search
CPC .......... G01S 7/352; G01S 7/356; G01S 7/417; G01S 13/588; G01S 13/89; G01S 13/931
See application file for complete search history.

(56) References Cited

U.S. PATENT DOCUMENTS

| | | | | |
|---|---|---|---|---|
| 5,675,343 A | * | 10/1997 | Champeau | H01Q 21/22 342/372 |
| 9,739,881 B1 | * | 8/2017 | Pavek | G01S 13/89 |
| 9,983,305 B2 | * | 5/2018 | Pavek | G01S 13/931 |
| 10,473,775 B2 | * | 11/2019 | Slemp | H01Q 1/3275 |
| 11,002,845 B2 | * | 5/2021 | Okamoto | G01S 13/46 |
| 2012/0119937 A1 | * | 5/2012 | Yamada | G01S 13/931 342/70 |
| 2014/0125511 A1 | * | 5/2014 | Longstaff | G05D 1/0858 342/33 |
| 2019/0115670 A1 | * | 4/2019 | Kishigami | G01S 13/003 |
| 2019/0195998 A1 | * | 6/2019 | Campbell | G01S 13/426 |
| 2019/0279366 A1 | * | 9/2019 | Sick | G06K 9/6256 |
| 2019/0285738 A1 | * | 9/2019 | Iwasa | G01S 7/032 |
| 2019/0293753 A1 | * | 9/2019 | Iwasa | G01S 7/03 |
| 2019/0324134 A1 | * | 10/2019 | Cattle | G01S 13/931 |

(Continued)

*Primary Examiner* — Peter M Bythrow
(74) *Attorney, Agent, or Firm* — Cantor Colburn LLP (57) ABSTRACT

A method and system involve obtaining reflected signals in a radar system using a first one-dimensional array of antenna elements and a second one-dimensional array of antenna elements. The reflected signals result from reflection of transmitted signals from the radar system by one or more objects. The method includes processing the reflected signals obtained using the first one-dimensional array of antenna elements to obtain a first array of angle of arrival likelihood values in a first plane, and processing the reflected signals obtained using the second one-dimensional array of antenna elements to obtain a second array of angle of arrival likelihood values. A four-dimensional image indicating a range, relative range rate, the first angle of arrival, and the second angle of arrival for each of the one or more objects is obtained.

18 Claims, 4 Drawing Sheets

(56) References Cited

U.S. PATENT DOCUMENTS

| | | | | |
|---|---|---|---|---|
| 2020/0096626 | A1* | 3/2020 | Wang | G01S 13/426 |
| 2021/0116531 | A1* | 4/2021 | Shabtay | G06K 9/628 |
| 2021/0116560 | A1* | 4/2021 | Gulati | G01S 13/76 |
| 2021/0320425 | A1* | 10/2021 | Arkind | H01Q 21/28 |

\* cited by examiner

AZIMUTH AND ELEVATION RADAR IMAGING WITH SINGLE-DIMENSION ANTENNA ARRAYS OF RADAR SYSTEM

INTRODUCTION

The subject disclosure relates to azimuth and elevation radar imaging with single-dimension antenna arrays of a radar system.

Radar systems and other sensors are increasingly used in vehicles (e.g., automobiles, trucks, farm equipment, construction equipment, automated factories) to obtain information about the vehicle and its surroundings. A radar system may identify objects in the path of the vehicle, for example, and facilitate autonomous or semi-autonomous vehicle operation. A radar system with a two-dimensional matrix of antenna elements arranged both horizontally and vertically provides four-dimensional radar images (range, range rate, azimuth angle, elevation angle). That is, the arrangement of the antenna elements facilitates determination of the position of a reflecting object in both azimuth and elevation, as well as in range and range rate, which is determined from Doppler shift. However, for a given resolution of azimuth and elevation, the two-dimensional matrix represents a large number of antenna elements. Accordingly, it is desirable to provide azimuth and elevation radar imaging with single-dimension antenna arrays of a radar system.

SUMMARY

In one exemplary embodiment, a method includes obtaining reflected signals in a radar system using a first one-dimensional array of antenna elements arranged in a first direction and a second one-dimensional array of antenna elements arranged in a second direction that is different than the first direction. The reflected signals result from reflection of transmitted signals from the radar system by one or more objects. The method also includes processing the reflected signals obtained using the first one-dimensional array of antenna elements to obtain a first array of angle of arrival likelihood values in a first plane for the reflected signals from the one or more objects, and processing the reflected signals obtained using the second one-dimensional array of antenna elements to obtain a second array of angle of arrival likelihood values in a second plane for the reflected signals from the one or more objects. A four-dimensional image indicating a range, relative range rate, the first angle of arrival, and the second angle of arrival for each of the one or more objects is obtained.

In addition to one or more of the features described herein, the processing the reflected signals obtained using the first one-dimensional array of antenna elements and the processing the reflected signals obtained using the second one-dimensional array of antenna elements includes performing fast Fourier transforms.

In addition to one or more of the features described herein, the processing the reflected signals obtained using the first one-dimensional array of antenna elements and the processing the reflected signals obtained using the second one-dimensional array of antenna elements includes performing beamforming.

In addition to one or more of the features described herein, the using the first one-dimensional array of antenna elements includes using a horizontal array of antenna elements, and the using the second one-dimensional array of antenna elements includes using a vertical array of antenna elements.

In addition to one or more of the features described herein, the obtaining the first angle of arrival includes obtaining an azimuth angle, and the obtaining the second angle of arrival includes obtaining an elevation angle.

In addition to one or more of the features described herein, the method also includes training a neural network to provide the four-dimensional image using the first one-dimensional array of antenna elements and the second one-dimensional array of antenna elements.

In addition to one or more of the features described herein, the method also includes obtaining training reflected signals using a two-dimensional array of antenna elements, and obtaining a training four-dimensional image indicating a range, range rate, the first array of angle of arrival likelihood values, and the second array of angle of arrival likelihood values by processing the training reflected signals obtained using the two dimensional array of antenna elements.

In addition to one or more of the features described herein, the method also includes obtaining the training reflected signals using the first one-dimensional array of antenna elements and the second one-dimensional array of antenna elements, and obtaining the four-dimensional image based on processing the training reflected signals obtained using the first one-dimensional array of antenna elements and the second one-dimensional array of antenna elements and using the neural network.

In addition to one or more of the features described herein, the method also includes providing feedback to the neural network by comparing the training four-dimensional image obtained using the two-dimensional array of antenna elements and the four-dimensional image obtained using the first one-dimensional array of antenna elements and the second one-dimensional array of antenna elements and using the neural network.

In addition to one or more of the features described herein, the method also includes locating the radar system in a vehicle and controlling operation of the vehicle based on information about the one or more objects indicated by the four-dimensional image.

In another exemplary embodiment, a system includes a radar system including a first one-dimensional array of antenna elements arranged in a first direction and a second one-dimensional array of antenna elements arranged in a second direction that is different than the first direction. The first one-dimensional array of antenna elements and the second one-dimensional array of antenna elements receive reflected signals. The reflected signals result from reflection of transmitted signals from the radar system by one or more objects. The system also includes a controller to process the reflected signals obtained using the first one-dimensional array of antenna elements to obtain a first array of angle of arrival likelihood values in a first plane for the reflected signals from the one or more objects, to process the reflected signals obtained using the second one-dimensional array of antenna elements to obtain a second array of angle of arrival likelihood values in a second plane for the reflected signals from the one or more objects, and to obtain a four-dimensional image indicating a range, relative range rate, the first angle of arrival, and the second angle of arrival for each of the one or more objects.

In addition to one or more of the features described herein, the controller processes the reflected signals obtained using the first one-dimensional array of antenna elements and the reflected signals obtained using the second one-dimensional array of antenna elements by performing fast Fourier transforms.

In addition to one or more of the features described herein, the controller processes the reflected signals obtained using the first one-dimensional array of antenna elements and to process the reflected signals obtained using the second one-dimensional array of antenna elements by performing beamforming.

In addition to one or more of the features described herein, the first one-dimensional array of antenna elements is a horizontal array of antenna elements, and the second one-dimensional array of antenna elements is a vertical array of antenna elements.

In addition to one or more of the features described herein, the first angle of arrival is an azimuth angle, and the second angle of arrival is an elevation angle.

In addition to one or more of the features described herein, the controller trains a neural network to provide the four-dimensional image using the first one-dimensional array of antenna elements and the second one-dimensional array of antenna elements.

In addition to one or more of the features described herein, the controller obtains training reflected signals using a two-dimensional array of antenna elements, and to obtain a training four-dimensional image indicating a range, range rate, the first array of angle of arrival likelihood values, and the second array of angle of arrival likelihood values by processing the training reflected signals obtained using the two dimensional array of antenna elements.

In addition to one or more of the features described herein, the controller obtains the training reflected signals using the first one-dimensional array of antenna elements and the second one-dimensional array of antenna elements, and to obtain the four-dimensional image based on processing the training reflected signals obtained using the first one-dimensional array of antenna elements and the second one-dimensional array of antenna elements and using the neural network.

In addition to one or more of the features described herein, the controller provides feedback to the neural network by comparing the training four-dimensional image obtained using the two-dimensional array of antenna elements and the four-dimensional image obtained using the first one-dimensional array of antenna elements and the second one-dimensional array of antenna elements and using the neural network.

In addition to one or more of the features described herein, the radar system is located in a vehicle and operation of the vehicle is controlled based on information about the one or more objects indicated by the four-dimensional image.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, a two-dimensional matrix of antenna elements provides four-dimensional radar images. Specifically, the two-dimensional matrix of antenna elements provides both azimuth and elevation to an object that reflected transmitted energy from the antenna elements in addition to range and range rate. By contrast, an array of antenna elements arranged horizontally provides resolution in azimuth but not in elevation while an array of antenna elements arranged vertically provides resolution in elevation but not in azimuth. However, for a given resolution in azimuth and a given resolution in elevation, the two-dimensional matrix of antenna elements will require more total antenna elements than a horizontal array of antenna elements for the same given resolution in azimuth and a vertical array of antenna elements for the same given resolution in elevation.

Embodiments of the systems and methods detailed herein relate to azimuth and elevation radar imaging with single-dimension antenna arrays of a radar system. Specifically, a horizontal array of antenna elements and a vertical array of antenna elements are used along with a trained neural network to obtain the same resolution in azimuth and in elevation as a matrix with more antenna elements than the sum of the horizontal antenna elements and vertical antenna elements. Alternately, by using the same total number of antenna elements as a given matrix of antenna elements and dividing that total number of antenna elements into a horizontal array of antenna elements and a vertical array of antenna elements, a higher resolution in azimuth and elevation may be achieved.

Figure 1:
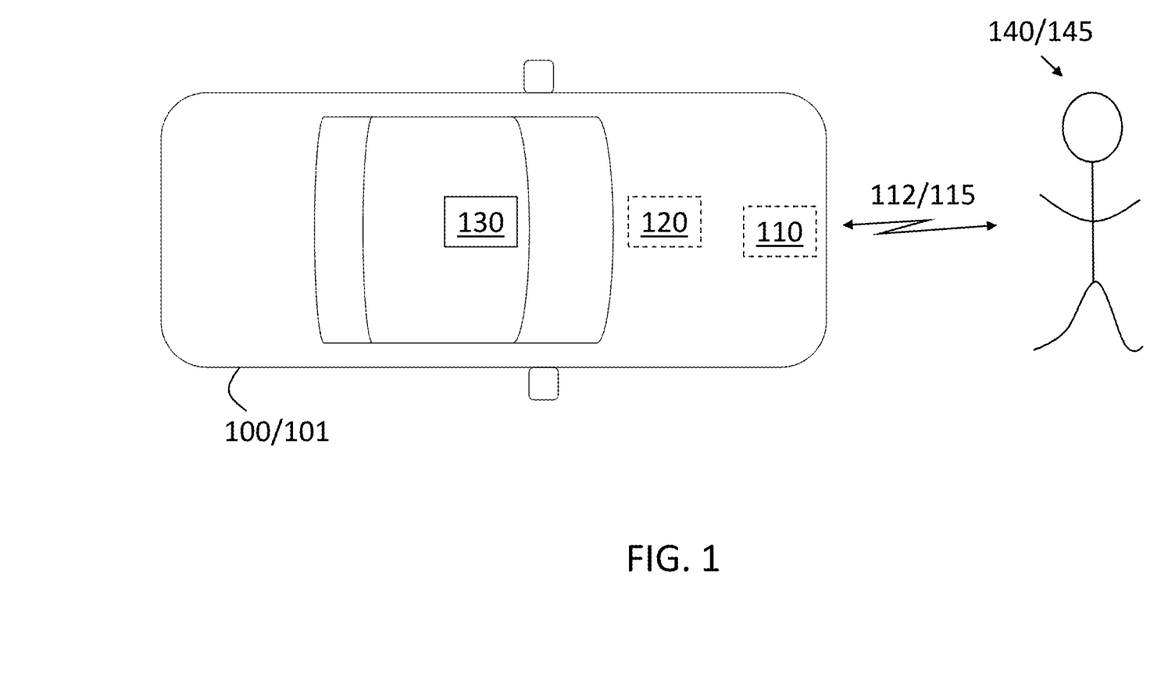
FIG. 1 is a block diagram of a vehicle with a radar system that obtains four-dimensional images according to one or more embodiments.

In accordance with an exemplary embodiment, FIG. 1 is a block diagram of a vehicle 100 with a radar system 110 that obtains four-dimensional images. The exemplary vehicle 100 shown in FIG. 1 is an automobile 101. The vehicle 100 also includes other sensors 130 (e.g., camera, lidar system) and a controller 120. The controller 120 may control aspects of the operation of the vehicle 100 based on information obtained from the radar system 110 alone or in combination with other sensors 130. The radar system 110 transmits transmit signals 112 and receives reflected signals 115 when objects 140 in the field of view of the radar system 110 reflect the transmit signals 112. The radar system 110 may include a single transmitter antenna and multiple receiver antennas or multi transmitter antennas and a single receiver antenna. Alternately, the radar system 110 may be a multiple input multiple output (MIMO) system with multiple transmit antennas and multiple receive antennas. The exemplary object 140 shown in FIG. 1 is a pedestrian 145. The reflected signals 115 may be processed within the radar system 110, by the controller 120, or a combination of the two. Whether in the radar system 110 or the controller 120, the processing involves processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
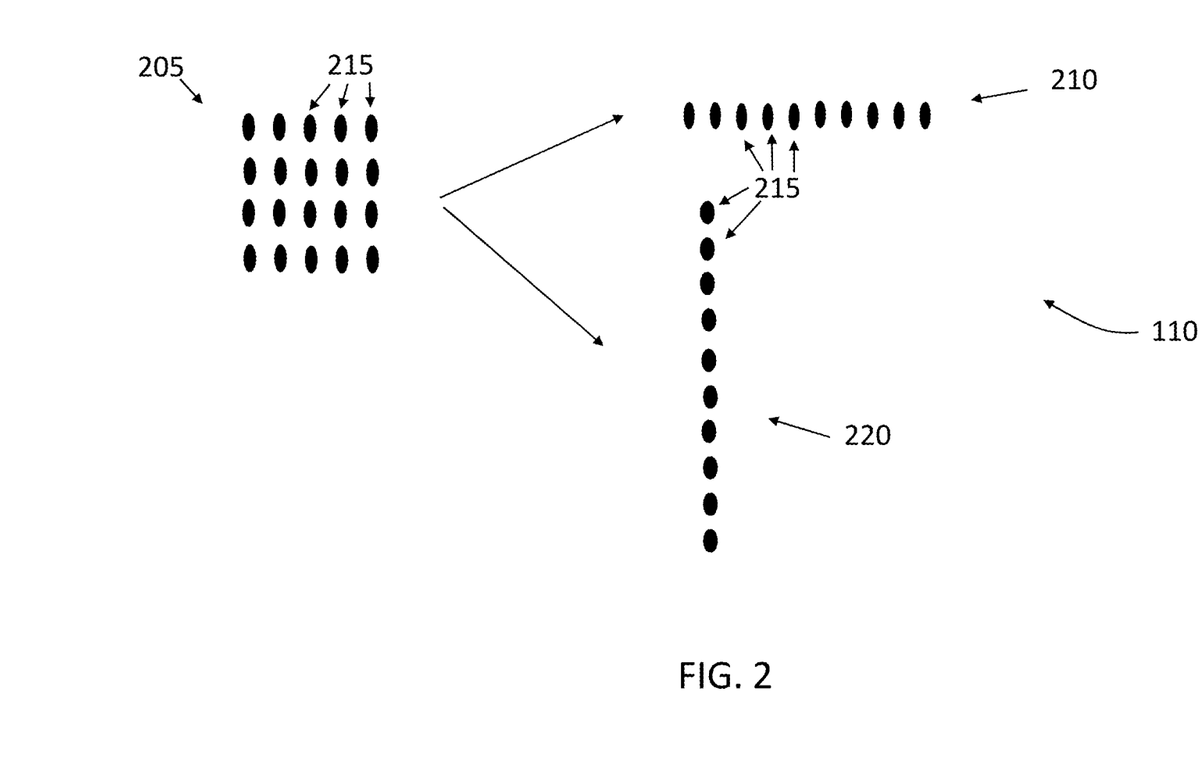
FIG. 2 shows aspects of the radar system configured to provide azimuth and elevation radar imaging with single-dimension antenna arrays according to one or more embodiments.

FIG. 2 shows aspects of the radar system 110 configured to provide azimuth and elevation radar imaging with single-dimension antenna arrays according to one or more embodiments. The antenna elements 215 shown in FIG. 2 are receive antenna elements 215 in a single transmit and multiple receive system or the virtual antennas of a MIMO system. An exemplary two-dimensional antenna array 205 with four rows of five antenna elements 215 (i.e., twenty total antenna elements 215) is shown. According to one or more embodiments, the exemplary radar system 110 includes a one-dimensional horizontal antenna array 210 and a one-dimensional vertical antenna array 220 rather than the exemplary two-dimensional antenna array 205. The one-dimensional horizontal antenna array 210 and the one-dimensional vertical antenna array 220 are each shown with ten antenna elements 215. That is, in the exemplary case, the total number of antenna elements 215 in the two-dimensional array 205 is the same as the total number of antenna elements 215 used by the radar system 110 in the form of two one-dimensional arrays 210, 220.

Assuming that all the antenna elements 215 are a half-wavelength distance from adjacent antenna elements 215, the aperture of the radar system 110 in both azimuth and elevation is at least double the aperture that is obtained with the two-dimensional antenna array 205. The resolution in both azimuth and elevation using the two one-dimensional arrays 210, 220 is improved over the resolution obtained with the two-dimensional antenna array 205. As previously noted, alternately, the same aperture and resolution of the two-dimensional array 205 may be maintained in the radar system 110 with fewer total antenna elements 215 used in the one dimensional arrays 210, 220. The discussion with reference to FIGS. 3 and 4 details how a four-dimensional image (i.e., range, Doppler (range rate), azimuth, elevation) is obtained with the one-dimensional arrays 210, 220. The exemplary one-dimensional antenna arrays shown and discussed for explanatory purposes are a one-dimensional horizontal antenna array 210 and a one-dimensional vertical antenna array 220 (i.e., perpendicular one-dimensional arrays 210, 220). However, the two one-dimensional arrays 210, 220 may not be perpendicular (i.e., may have an angle different than 90 degrees between them).

Figure 3:
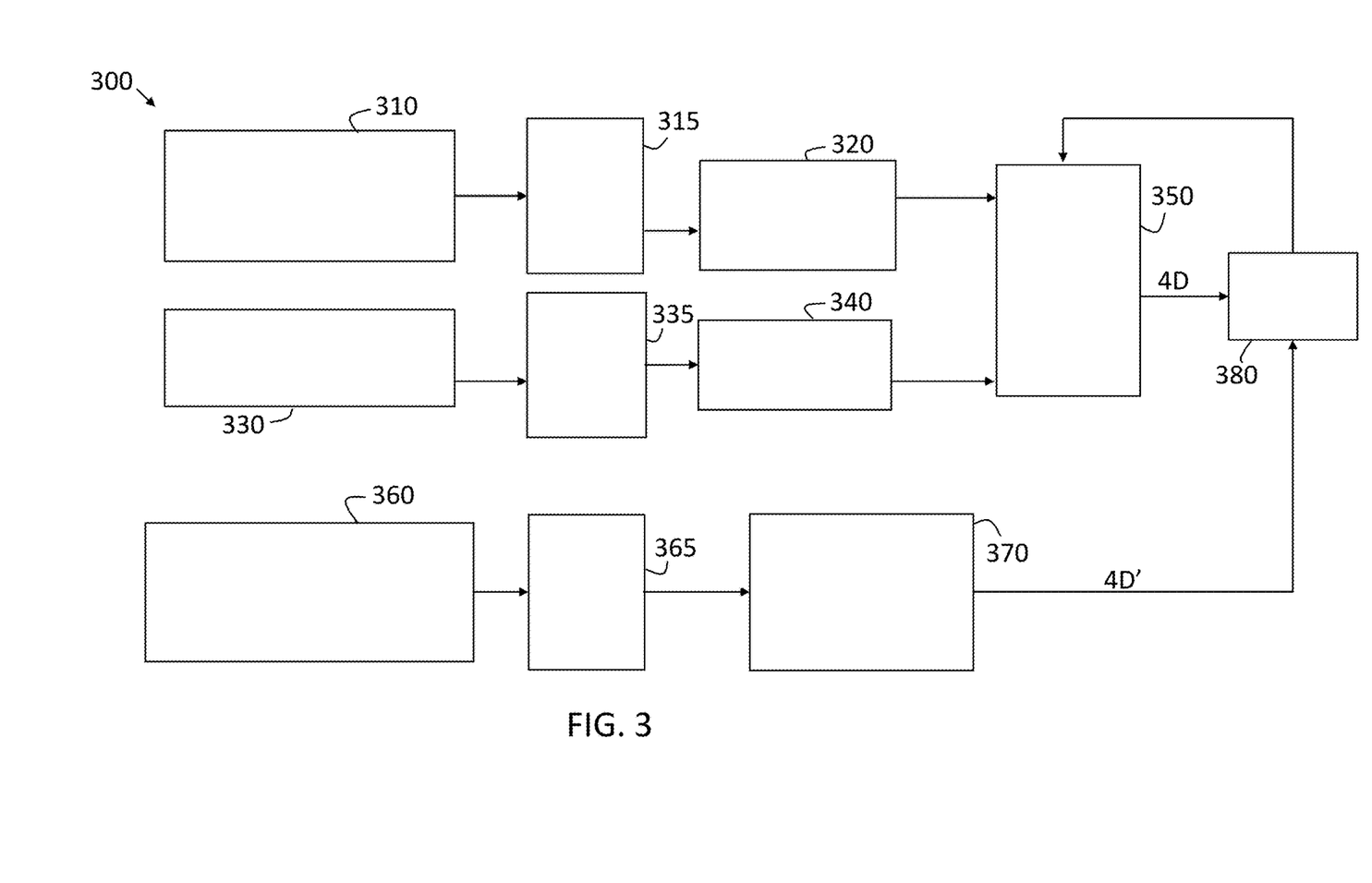
FIG. 3 is a process flow of a method of training a neural network to implement azimuth and elevation radar imaging with single-dimension antenna arrays of a radar system according to one or more embodiments.

FIG. 3 is a process flow 300 of a method of training a neural network to implement azimuth and elevation radar imaging with single-dimension antenna arrays of a radar system 110 according to one or more embodiments. At block 310, obtaining reflected signals 115 involves using a one-dimensional horizontal antenna array 210. At block 330, obtaining reflected signals 115 involves using a one-dimensional vertical antenna array 220. Blocks 315 and 320 and blocks 335 and 340 involve respectively processing the reflected signals 115 obtained by the one-dimensional horizontal antenna array 210 and the one-dimensional vertical antenna array 220. An analog-to-digital converter (ADC) may be used first to perform the processing on digital signals. The transmitted signals 112 may be a linear frequency modulated continuous wave (LFM CW) signal referred to as a chirp, for example.

Performing range and Doppler filtering, at block 315 and block 335, involves performing two fast Fourier transforms (FFTs). A range FFT results in the indication of energy across detectable ranges for each chirp or a range-chirp map. The subsequent Doppler FFT results in an indication of energy across ranges and over Doppler (i.e., range rate of the object 140 relative to the radar system 110) or a range-Doppler map. Performing azimuth beamforming, at block 320, or elevation beamforming, at block 340, refers to using the range-Doppler map per each pair of transmit and receive antennas resulting in a vector of complex scalars per each range-Doppler value and multiplying this vector with a matrix of actual reflected signals 115 at each receive antenna element 215 for each angle of arrival of reflected signal 115. Digital beamforming provides a range-azimuth-Doppler image, at block 320, or a range-elevation-Doppler image, at block 340. That is, the beamforming provides an intensity associated with each (azimuth or elevation) angle (i.e., an array of angle of arrival likelihood values). Thus, an estimate of the angle of arrival may be obtained by determining the angle associated with the highest intensity value. The beamforming result at blocks 320 and 340 and the range Doppler filtering result at blocks 315 and 335 provide a range-azimuth/elevation-Doppler image as an input to the neural network at block 350.

At block 350, the neural network uses the range-azimuth-Doppler image from the azimuth beamforming (at block 320) and the range-elevation-Doppler image from the elevation beamforming (at block 340) to construct a four-dimensional (4D) image of range, Doppler, azimuth, and elevation. Essentially, the neural network reconstructs the result of a two-dimensional matrix of antenna elements 215. At block 360, reflected signals 115 are obtained by a two-dimensional antenna array 205. Range and Doppler filtering, at block 365, is similar to the range and Doppler filtering at blocks 315 and 335. At block 370, azimuth and elevation beamforming is performed in a similar manner to the processing at blocks 320 and 340. However, because a two-dimensional antenna array 205 is used, both azimuth and elevation are obtained from the single dataset. That is, the beamforming result is a two-dimensional matrix of intensity values for different azimuth and elevation combinations. The four-dimensional image (4D') of range, Doppler, azimuth and elevation are provided for comparison with the four-dimensional image (4D) provided by the neural network, at block 350.

At block 380, a loss determination is done by comparing the four-dimensional image (4D) provided by the neural network, at block 350, with the four-dimensional image (4D') provided by processing of reflected signals 115 obtained using a two-dimensional antenna array 205. The loss determination may be based on an L1-norm loss function or L2-norm loss function, for example. This loss determination provides feedback to the neural network as part of the training. The reflected signals 115 obtained at block 310, 330, and 360 may be real signals (i.e., actually received) or may be simulated according to alternate embodiments. Once the neural network is trained according to the process flow 300, it is deployed for use according to the process flow 400 shown in FIG. 4.

Figure 4:
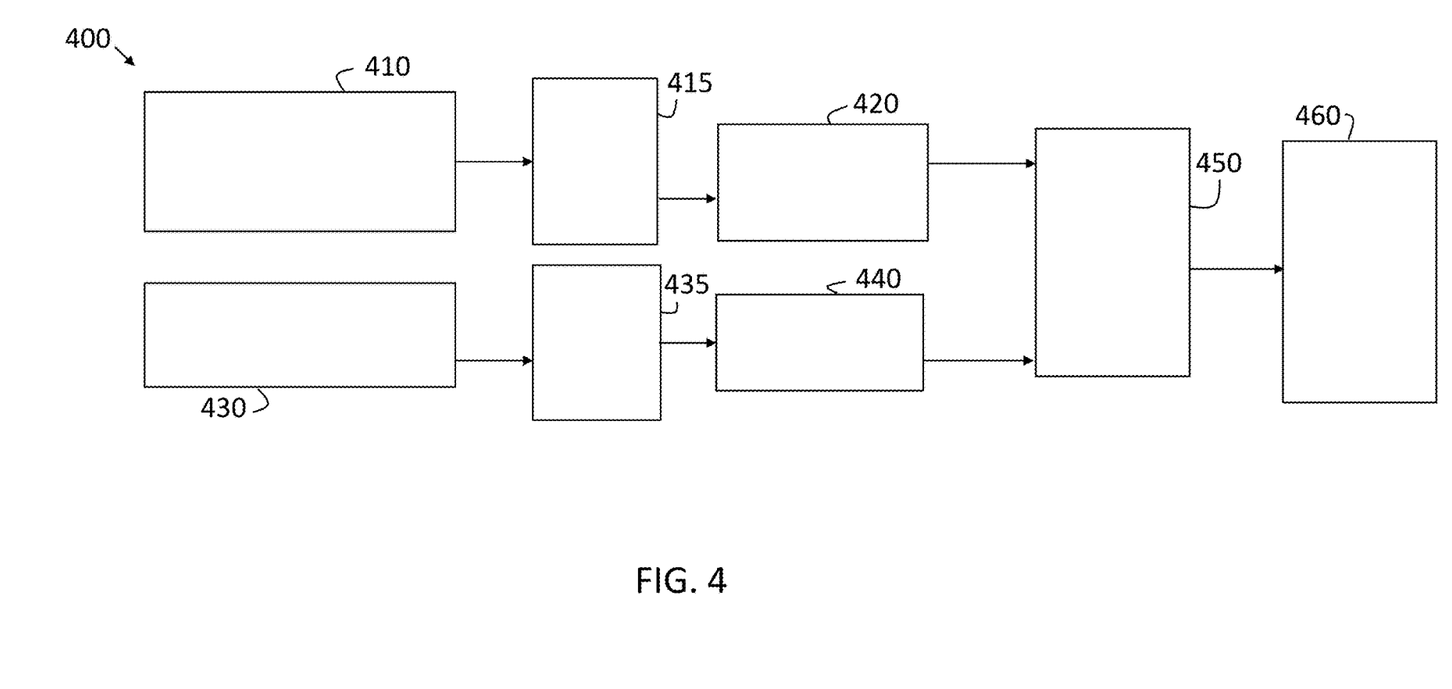
FIG. 4. is a process flow of a method of obtaining azimuth and elevation radar imaging with single-dimension antenna arrays of a radar system according to one or more embodiments.

FIG. 4 is a process flow 400 of a method of obtaining azimuth and elevation radar imaging with single-dimension antenna arrays of a radar system 110 according to one or more embodiments. The process flow 400 shown in FIG. 4 involves the radar system 110 deployed in a vehicle 100, for example. The process flow 400 includes obtaining reflected signals 115 with a one-dimensional horizontal antenna array 210, at block 410, and with a one-dimensional vertical antenna array 220, at block 430. The range and Doppler filtering via FFTs, at blocks 415 and 434, result in a range-Doppler map, as previously discussed. The azimuth beamforming, at block 420, results in a range-azimuth-Doppler image, and the elevation beamforming, at block 440, results in a range-elevation-Doppler image. The processing at blocks 415, 420, 435, and 440 may be performed within the radar system 110 or with the controller 120 of the vehicle 100. At block 450, the trained neural network uses the range-azimuth-Doppler image and the range-elevation-Doppler image to provide a four-dimensional image indicating range, Doppler (i.e., range rate of the object 140 relative to the radar system 110), azimuth, and elevation. The result of the neural network may be used to locate detected objects and control the vehicle 100, as needed, at block 460. That is, by applying detection thresholds to the four-dimensional image, the range, Doppler, azimuth angle, and elevation angle for each detected object 140 may be obtained. The detection result provided by the neural network may be used to control aspects of the operation of the vehicle 100.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method, comprising:
   obtaining reflected signals in a radar system using a first one-dimensional array of antenna elements arranged in a first direction and a second one-dimensional array of antenna elements arranged in a second direction that is different than the first direction, the reflected signals resulting from reflection of transmitted signals from the radar system by one or more objects;
   processing, using a processor, the reflected signals obtained using the first one-dimensional array of antenna elements to obtain a first array of angle of arrival likelihood values in a first plane for the reflected signals from the one or more objects;
   processing, using the processor, the reflected signals obtained using the second one-dimensional array of antenna elements to obtain a second array of angle of arrival likelihood values in a second plane for the reflected signals from the one or more objects;
   obtaining, using the processor, a four-dimensional image indicating a range, relative range rate, the first angle of arrival, and the second angle of arrival for each of the one or more objects; and
   training a neural network to provide the four-dimensional image using the first one-dimensional array of antenna elements and the second one-dimensional array of antenna elements.

2. The method according to claim 1, wherein the processing the reflected signals obtained using the first one-dimensional array of antenna elements and the processing the reflected signals obtained using the second one-dimensional array of antenna elements includes performing fast Fourier transforms.

3. The method according to claim 2, wherein the processing the reflected signals obtained using the first one-dimensional array of antenna elements and the processing the reflected signals obtained using the second one-dimensional array of antenna elements includes performing beamforming.

4. The method according to claim 1, wherein the using the first one-dimensional array of antenna elements includes using a horizontal array of antenna elements, and the using the second one-dimensional array of antenna elements includes using a vertical array of antenna elements.

5. The method according to claim 4, wherein the obtaining the first angle of arrival includes obtaining an azimuth angle, and the obtaining the second angle of arrival includes obtaining an elevation angle.

6. The method according to claim 1, further comprising obtaining training reflected signals using a two-dimensional array of antenna elements, and obtaining a training four-dimensional image indicating a range, range rate, the first array of angle of arrival likelihood values, and the second array of angle of arrival likelihood values by processing the training reflected signals obtained using the two dimensional array of antenna elements.

7. The method according to claim 6, further comprising obtaining the training reflected signals using the first one-dimensional array of antenna elements and the second one-dimensional array of antenna elements, and obtaining the four-dimensional image based on processing the training reflected signals obtained using the first one-dimensional array of antenna elements and the second one-dimensional array of antenna elements and using the neural network.

8. The method according to claim 7, further comprising providing feedback to the neural network by comparing the training four-dimensional image obtained using the two-dimensional array of antenna elements and the four-dimensional image obtained using the first one-dimensional array of antenna elements and the second one-dimensional array of antenna elements and using the neural network.

9. The method according to claim 1, further comprising locating the radar system in a vehicle and controlling operation of the vehicle based on information about the one or more objects indicated by the four-dimensional image.

10. A system, comprising:
    a radar system including a first one-dimensional array of antenna elements arranged in a first direction and a second one-dimensional array of antenna elements arranged in a second direction that is different than the first direction, the first one-dimensional array of antenna elements and the second one-dimensional array of antenna elements being configured to receive reflected signals, and the reflected signals resulting from reflection of transmitted signals from the radar system by one or more objects; and
    a controller configured to process the reflected signals obtained using the first one-dimensional array of antenna elements to obtain a first array of angle of arrival likelihood values in a first plane for the reflected signals from the one or more objects, to process the reflected signals obtained using the second one-dimensional array of antenna elements to obtain a second array of angle of arrival likelihood values in a second plane for the reflected signals from the one or more objects, and to obtain a four-dimensional image indicating a range, relative range rate, the first angle of arrival, and the second angle of arrival for each of the one or more objects, wherein the controller is further configured to train a neural network to provide the four-dimensional image using the first one-dimensional array of antenna elements and the second one-dimensional array of antenna elements.

11. The system according to claim 10, wherein the controller is configured to process the reflected signals obtained using the first one-dimensional array of antenna elements and the reflected signals obtained using the second one-dimensional array of antenna elements by performing fast Fourier transforms.

12. The system according to claim 11, wherein the controller is configured to process the reflected signals obtained using the first one-dimensional array of antenna elements and to process the reflected signals obtained using the second one-dimensional array of antenna elements by performing beamforming.

13. The system according to claim 10, wherein the first one-dimensional array of antenna elements is a horizontal array of antenna elements, and the second one-dimensional array of antenna elements is a vertical array of antenna elements.

14. The system according to claim 13, wherein the first angle of arrival is an azimuth angle, and the second angle of arrival is an elevation angle.

15. The system according to claim 10, wherein the controller is further configured to obtain training reflected signals using a two-dimensional array of antenna elements, and to obtain a training four-dimensional image indicating a range, range rate, the first array of angle of arrival likelihood values, and the second array of angle of arrival likelihood values by processing the training reflected signals obtained using the two dimensional array of antenna elements.

16. The system according to claim 15, wherein the controller is further configured to obtain the training reflected signals using the first one-dimensional array of antenna elements and the second one-dimensional array of antenna elements, and to obtain the four-dimensional image based on processing the training reflected signals obtained using the first one-dimensional array of antenna elements and the second one-dimensional array of antenna elements and using the neural network.

17. The system according to claim 16, wherein the controller is further configured to provide feedback to the neural network by comparing the training four-dimensional image obtained using the two-dimensional array of antenna elements and the four-dimensional image obtained using the first one-dimensional array of antenna elements and the second one-dimensional array of antenna elements and using the neural network.

18. The system according to claim 10, wherein the radar system is located in a vehicle and operation of the vehicle is controlled based on information about the one or more objects indicated by the four-dimensional image.

* * * * *